(12) United States Patent
Wilson et al.

(10) Patent No.: US 8,072,091 B2
(45) Date of Patent: Dec. 6, 2011

(54) METHODS, SYSTEMS, AND DEVICES FOR ENERGY GENERATION

(75) Inventors: Samuel B. Wilson, Halifax, VA (US); Paul Gelhausen, Yorktown, VA (US); Andrew R Turnbull, Newport News, VA (US); Timothy Street, Blacksburg, VA (US)

(73) Assignee: Samuel B. Wilson, III, Halifax, VA (US)

( * ) Notice: Subject to any disclaimer, the term of this patent is extended or adjusted under 35 U.S.C. 154(b) by 619 days.

(21) Appl. No.: 12/104,500

(22) Filed: Apr. 17, 2008

(65) Prior Publication Data

US 2008/0258467 A1 Oct. 23, 2008

Related U.S. Application Data

(60) Provisional application No. 60/912,568, filed on Apr. 18, 2007.

(51) Int. Cl.
*F03D 9/00* (2006.01)
(52) U.S. Cl. ............................................. 290/55; 290/44
(58) Field of Classification Search .................. 290/42, 290/43, 44, 53, 54, 55
See application file for complete search history.

(56) References Cited

U.S. PATENT DOCUMENTS

| | | | |
|---|---|---|---|
| 648,442 A * | 5/1900 | Scott | 415/4.1 |
| 4,075,500 A | 2/1978 | Oman et al. | |
| 4,076,448 A * | 2/1978 | Sanders, Jr. | 415/198.1 |
| 4,127,356 A * | 11/1978 | Murphy | 415/4.1 |
| 4,191,505 A * | 3/1980 | Kaufman | 415/2.1 |
| 4,279,569 A * | 7/1981 | Harloff | 415/53.3 |
| 4,720,640 A | 1/1988 | Anderson et al. | |
| 5,009,569 A * | 4/1991 | Hector et al. | 415/4.1 |
| 5,038,049 A * | 8/1991 | Kato | 290/55 |
| 5,155,992 A * | 10/1992 | Follensbee et al. | 60/200.1 |
| 5,350,273 A * | 9/1994 | Hector et al. | 415/4.1 |
| 5,394,016 A * | 2/1995 | Hickey | 290/55 |
| 5,457,346 A * | 10/1995 | Blumberg et al. | 290/55 |
| 6,437,457 B2 * | 8/2002 | Roskey | 290/55 |
| 6,537,025 B2 * | 3/2003 | Hopkins et al. | 415/202 |
| 6,836,028 B2 | 12/2004 | Northrup et al. | |
| 6,849,964 B2 * | 2/2005 | Becherucci et al. | 290/55 |
| 6,939,101 B2 | 9/2005 | Yu et al. | |
| 6,981,839 B2 * | 1/2006 | Fan | 415/4.1 |
| 6,984,899 B1 * | 1/2006 | Rice | 290/44 |
| 7,018,166 B2 | 3/2006 | Gaskell | |

(Continued)

OTHER PUBLICATIONS

S. C. Tsai et al., Flap-Cone Control of Windmill Speed, Alternative Energy Sources: An International Compendium, 1978, 1681-1692, vol. 4, Hemisphere Publishing Corp., Washington, D.C., U.S.A.

*Primary Examiner* — Nicholas Ponomarenko
(74) *Attorney, Agent, or Firm* — New River Valley IP Law; Michele L. Mayberry (57) ABSTRACT

The present invention seeks to improve upon existing energy-generation technologies by providing methods, systems, and devices for converting mechanical power into electrical power. More specifically, the present invention relates to fluid-powered generators and methods, systems, and devices for generating power by way of such fluid-powered generators. The present invention includes devices for generating energy comprising fluid turbine generators having variable inlet(s), wherein the fluid velocity, volume, and/or mass of fluid collected by the inlet can be varied to control turbine speed to provide a reasonably steady, continuous, and/or sufficient source of energy over a wide range of conditions presented by natural fluid resources.

15 Claims, 4 Drawing Sheets

U.S. PATENT DOCUMENTS

| | | | |
|---|---|---|---|
| 7,112,034 B2 * | 9/2006 | Bezemer | 415/3.1 |
| 7,199,486 B2 * | 4/2007 | Roskey | 290/55 |
| 7,215,037 B2 * | 5/2007 | Scalzi | 290/55 |
| 7,521,816 B2 * | 4/2009 | Helfrich | 290/54 |
| 7,663,262 B2 * | 2/2010 | Roskey | 290/55 |
| 7,748,947 B2 * | 7/2010 | Caldwell | 415/4.1 |

* cited by examiner

FIG. 4

METHODS, SYSTEMS, AND DEVICES FOR ENERGY GENERATION

CROSS-REFERENCE TO RELATED APPLICATIONS

This application relies on the disclosure and claims the benefit of the filing date of U.S. Provisional Application No. 60/912,568, filed Apr. 18, 2007, the entire disclosure of which is herein incorporated by reference.

BACKGROUND OF THE INVENTION

1. Field of the Invention

The present invention relates generally to the field of energy harvesting. More specifically, the present invention relates to the field of electrical energy generation and includes, for example, methods, systems, and devices for converting flowing fluids into electrical power. Further, for example, the present invention relates to fluid-powered generators and methods, systems, and devices for generating electrical energy with such fluid-powered generators.

2. Description of Related Art

There exists a continued interest around the world in the development of alternative energy sources from sources that cannot be exhausted and/or are renewable. Harnessing and using local resources for energy has the advantage of potentially reducing dependence on foreign sources of energy, such as foreign oil, and contributing to local economy. Further, using resources, such as wind, and water, as energy sources to generate power, for example, electrical power, has obvious environmental advantages as well. Finding more efficient ways to use wind and water resources will benefit our society and environment on a global level.

Some considerations present in determining whether harnessing natural or manmade resources, such as wind and water resources, is an effective alternative to conventional coal, oil, and gas resources include assessing the associated financial and aesthetic costs. It is well known that one solution for producing more energy from wind or water power is to create larger devices for harnessing these resources. Larger devices, however, may lead to greater safety concerns, noise concerns, and can even be an aesthetic eyesore to some. Additionally, because devices for harnessing wind and water power are typically exposed to the elements, such devices are usually situated out in the open. As a result of using larger devices to harness these natural resources, more land is typically a prerequisite to installing them, which in turn increases acquisition and maintenance costs of real estate, for example. Additionally, portable devices for converting wind and/or water power could likewise be advantageous for their remote servicing capabilities especially in emergency situations.

Wind and water resources have advantages and disadvantages, which are primarily dependent on factors that may be difficult or improbable to control. For example, wind and water are unpredictable energy sources, which can vary with the weather, by geographic location, and from day to day. Even further, wind and water resources can be affected by a number of other considerations, including buildings, towers or other structures, trees, and terrain to name a few, which may interfere with the amount and/or intensity of these resources that can be harnessed and converted to electrical energy.

Providing a reasonably steady, continuous, and sufficient source of electrical energy from wind and/or water resources is a goal in making alternative energy sources more attractive. To date, however, this goal has not easily been achieved.

In particular, with respect to harnessing wind energy, it is well understood that the amount of electrical energy that can be generated from wind is dependent, at least in part, on the velocity and/or air mass density of the wind. Because wind velocity and air density can be at times unpredictable and/or fluctuating, it is difficult to achieve a reasonably steady, continuous, and sufficient output of electrical power from such systems. Thus, it would be advantageous to develop methods, devices, and systems for generating power that can operate over a wide range of wind or water conditions.

With respect to fluid-based power generators, in general, most power generating systems are not able to produce a useful amount of energy when the conditions presented by a particular fluid fluctuate greatly, e.g., drop below minimum required levels, or even exceed maximum allowed operating parameters for a particular generator. With respect to wind-based power generation, in particular, when the wind speed drops below a certain level, the generator may not operate or may not be able to produce a useful amount of energy. Most existing designs are not capable of operating below ambient wind speeds of, for example, 15 mph. Likewise, when the wind speed exceeds a level that can be tolerated by a generator, the generator will shut down as a result of or to prevent overheating. Most existing systems for fluid-based power generation are, thus, unreliable and/or impractical over a wide range of operating conditions.

There exists, therefore, a need for generators that can operate over a wide range of fluid velocities and that can provide a relatively constant power output, regardless of the conditions presented by the fluid. With respect to wind-based power generation, for example, it would be advantageous to develop devices that are capable of providing a reasonably steady, continuous, and sufficient source of electrical energy and at a fixed frequency of AC power so the transformers can be simplified, made cheaper and more reliable. For example, it is desirous to have a fluid-based turbine generator that is capable of providing a relatively consistent power output, regardless of whether the generator is operating at a low fluid speed, such as a wind speed of 3 mph, or at a high fluid speed, such as at hurricane-level wind speeds. There have been numerous attempts to provide energy generators to address at least some of these concerns but none have addressed all conditions (i.e., the low speed, high speed, and constant power).

For example, U.S. Pat. No. 4,720,640, entitled "Fluid Powered Electrical Generator," describes an impellor-rotor mounted on a central support structure, with the outward ends of the blades of the fan being connected together by rotor rings. A peripheral electrical generator produces electrical energy when the impellor-rotor is driven by the fluid stream. Also provided is a downstream diffuser shroud to postpone, suppress, or eliminate what is referred to therein as a "stall" condition. The downstream diffuser shroud can be made of a flexible material for the purpose of flexing to conform to the changing conditions of the fluid on the output end of the system in response to an increase or decrease in fluid velocity through the diffuser shroud. FIG. 22 shows variability in the power output from the devices and, in particular, as wind velocity increases, the power density from the devices also increases, and FIG. 22 shows no appreciable power density for wind velocities below about 10 mph.

U.S. Pat. No. 4,075,500, entitled "Variable Stator, Diffuser Augmented Wind Turbine Electrical Generator System," and incorporated herein by reference in its entirety, includes a mechanism for varying the effective angle of attack on the rotor with respect to the wind. The devices operate to provide the proper approach and pre-swirling of incoming wind by using stators with trailing edge flaps to rotate the rotor as desired.

U.S. Pat. No. 6,836,028, entitled "Segmented Arc Generator," and incorporated herein by reference in its entirety, discloses converting mechanical power such as wind or water power into electrical power at a wide range of wind or shaft speeds. Devices described use a rotor ring that is in close proximity to a stator ring and some include a wind collector (for example, FIG. 4) to maximize exposure to wind. The wind collector is described as a funnel that increases the amount of air that is forced through the generator. The wind collector is fixed and can be rotated to an optimal position for receiving wind or to prevent damage in high wind conditions. Through use of a series stator coil connection by the switching matrix and voltage step-up by the boost converter, extraction of output power at 10% or less of rated speed can be achieved. The output power for continuous operation above rated speed is limited to the rated value due to current heating. Further, a power conditioning circuit enables the generator modules to operate efficiently at a wide range of fan speeds and a variable frequency control feature maintains constant voltage all through the designed RPM range.

U.S. Pat. No. 7,018,166, entitled "Ducted Wind Turbine," and incorporated herein by reference in its entirety, describes devices with a duct having a convergent and a divergent surface to control the fluid flow pattern along the inner duct surface. In addition to a drive rotor, a free rotor is used to reduce the pressure of air immediately upstream of the free rotor to, in turn, increase the velocity of air at the throat of the duct and, thus, the speed of the drive rotor.

U.S. Pat. No. 6,939,101, entitled "Windmill," and incorporated herein by reference in its entirety, provides devices for generating electricity, i.e., windmills having wind guide plates extending in a radial direction and an upper plate for preventing dispersion of the wind to collect the wind and thereby increase air density. Electricity can be stably generated using wind force irrespective of wind direction or wind velocity. The windmill can be installed in urban areas and mountain villages where wind direction and wind velocity frequently change.

"Flap-cone Control of Windmill Speed," in Alternative energy sources; Proceedings of the Miami International Conference, Miami Beach, Fla., Dec. 5-7, 1977, Volume 4, Washington, D.C., Hemisphere Publishing Corp., 1978, pages 1681-1692, which is incorporated herein by reference in its entirety, discloses a flap-cone method of controlling windmill speed. FIG. 2 shows a fixed inlet, which captures one volume of air for the system. The speed of the air is controlled by adjusting the flap cone at an outlet portion of the cone.

Previous attempts to solve some of the problems associated with non-conventional energy generation systems have maintained a focus different from that of the present invention. By controlling turbine speed within an optimum range of operating speeds for a particular generator, the power output of such systems can likewise be controlled to maintain an optimum range of power output. Using fluids for power in such systems can complicate this goal, especially, as described above, when the fluid flow is affected by external factors that are difficult to control. As the inventor of the present invention has discovered, turbine speed can be controlled with the inventive inlets described below, which control the amount of fluid collected by an energy generator system, regardless of the conditions presented by external fluid flow.

As contrasted with the above-described energy generating systems, the inventive methods, systems, and devices for energy generation are capable of operating over a wide range of fluid speeds, while providing a reasonably steady, continuous, and sufficient source of electrical energy by having inlet means for controlling fluid flow and turbine speed of fluid-powered turbine generators.

SUMMARY OF THE INVENTION

The present invention seeks to improve upon existing energy-generation technologies by providing methods, systems, and devices for converting mechanical power into electrical power. More specifically, the present invention relates to methods, systems, and devices for energy generation comprising variable inlet(s), wherein the fluid velocity, mass, and/or volume of fluid collected through the inlet of fluid turbine generators can be varied to control turbine speed and provide a reasonably steady, continuous, and/or sufficient source of energy over a wide range of conditions presented by natural fluid resources.

The present invention provides methods, systems, and devices for energy generation comprising a ducted turbine with at least one adjustable inlet for controlling the turbine speed of and/or for generating controlled or constant power output from a fluid-based energy generation system, such as a fluid-powered turbine generator. The present invention provides adjustable inlets for energy generation devices for controlling turbine speed and/or generating controlled or constant power output from fluid-based energy generation systems. Obtaining controlled and/or constant power output from the inventive systems can be achieved by controlling the amount of fluid entering the system by way of adjustable inlets.

Still further, the present invention includes methods, systems, and devices for energy generation comprising a ducted turbine disk with at least one adjustable inlet for generating controlled and/or constant power output from a fluid-powered turbine generator. In preferred embodiments, there are no blades external to the duct system, so all the rotating components are protected inside the duct.

Even further, the present invention includes methods, systems, and devices for remote, portable, and/or emergency-based energy generation comprising at least one ducted turbine with at least one adjustable inlet for generating controlled and/or constant power output from a fluid-powered turbine generator. In preferred embodiments, such devices can be quickly mounted on a small tower or even on a rescue vehicle.

Fluid-based energy generation systems, for example, fluid turbine generators, typically comprise a turbine (the means to extract energy from the flowing fluid) and a generator (means for converting that mechanical energy into electricity). The turbine, otherwise commonly referred to as a rotor or fan, usually consists of a number of blades that rotate about an axis. Fluid coming into contact with the blades causes the blades to rotate. A generator is used to convert the turning motion of the blades into power, e.g., electricity.

Other components of fluid-based energy generation systems can include ducts and/or nozzles for capturing, containing, and/or directing fluid for use in such systems. Ducts (or inlets) are typically positioned upstream or surrounding a turbine and can be used to direct fluid flow through the turbine. Ducts in accordance with the invention can comprise any number of sides or any configuration and can incorporate any number of adjustable inlets. Nozzles are typically placed downstream of a turbine to help reduce any interference (usually referred to as turbulence or back pressure) on the back side or exhaust of the fan.

The present invention contemplates applicability to and with any existing fluid-based energy generation system. The present invention can be used in conjunction with or as a replacement for current fluid-based energy generation systems. The present invention can be used and adapted for any size and/or power output application. In preferred embodiments, the ability to operate effectively at small size is one of the best features of the present invention. It is projected that a system the size of a kitchen waste basket can produce the same power as a conventional system having a propeller disk taller than a human.

The present invention includes methods, systems, and devices for energy generation comprising at least one ducted turbine having at least one adjustable inlet for controlling turbine speed. The inventive methods, systems, and devices are capable of operating over a wide range of fluid conditions. Adjustable inlets of the present systems can be used to capture more or less fluid, depending on the power output needs as well as changing fluid conditions. By controlling turbine speed, the methods, systems, and devices of the present invention are capable of controlling power output within a desired range. Preferably, the fluid-based energy generation systems of the present invention are capable of providing constant power and frequency output.

The methods, systems, and devices of the present invention include at least one ducted turbine with at least one adjustable inlet for a fluid turbine generator. Fluid turbine generators contemplated within the scope of this invention include any combination of turbine and generator system that is suitable for fluid-based power generation.

Energy Source. The inventive methods, systems, and devices are relevant to any fluid-powered application and can be powered by a wide variety of fluids and fluid combinations. Any substance capable of flowing is a fluid according to this invention, e.g., any substance whose molecules move freely past one another or any substance that tends to conform to the shape of its container. Fluids and fluid combinations that can be used in accordance with this invention include any liquid, gas, or plasma. For example, any phase of matter that has a tendency to flow can be used, including for example water, air, wind, and steam. Further, for example, mixtures of fluids are also contemplated within the scope of this invention, as well as mixtures of substances substantially constituting fluids, such as mud, waste liquids, smoke (e.g., the output from the exhaust of combustion engines), hot air rising vertically, and even small particles that "flow" to name a few.

The inventive methods, systems, and devices also are not restricted to stationary devices and/or do not require that the fluid be in motion or that only the fluid be in motion relative to the system. For example, the inventive methods, systems, and devices contemplate applications where a turbine is moved through a fluid that can also be moving or that is stationary. For example, the inventive devices could be mounted on any vehicle, including but not limited to trucks, buses, cars, aircraft, airships, aerostats, submarines, and boats. Any condition where the vehicle is moving through a fluid, such as water or air, (whether the fluid is stationary or is also moving), which causes fluid to move through the system can contribute to the power generation. Also, the system can be tethered in a flowing stream (of fluid) and the system can move into the center of the stream to maximize flow through the system.

Turbine and Generator. The present invention can be applied to any existing fluid-based energy generation system, such as existing turbine generators. Such systems typically comprise means for extracting energy from a flowing fluid (e.g., a turbine) and means for converting that mechanical energy into power (e.g., a generator).

The term turbine as used in this application is meant to encompass any means for extracting energy from a fluid power source, including means for providing propulsion power. It is further understood that the term turbine as used herein is not intended to be limiting but, instead, is used interchangeably with alternative terms, which may or may not be disclosed herein. For example, it is equally appropriate to refer to a turbine as a rotor or fan, which usually consists of a number of blades that rotate about an axis or hub. The turbine need not, however, comprise blades in particular and any means for contacting fluid to produce rotational movement is equally applicable, such as any propeller, impeller, screw-type device, blade, fan, or disk, to name a few.

A generator is used to convert the turning motion of the blades into power, e.g., electricity. The system can also be used "backwards" meaning that the flow through the duct can be reversed and the system will still produce power.

The construction materials employed in the inventive fluid-based energy generation systems can include any material suitable for this purpose, including, for example, fan blades made of any suitable material, such as plastic, metal, wood, etc., depending on a particular application. Additionally, any number, shape, or size of fan blades can be incorporated into the inventive methods, systems, and devices.

Further, in accordance with the present invention, any generator or motor can be employed, including a ring motor or hub motor, for example. The 'ducting' of the fluid into, through, and out of the system allows a wider selection of materials because the ducted system can shield the components from environmental damage (e.g., rain erosion of open wind turbines can cause damage to a system). Also, the safety of birds and bats can be increased with the use of ducted systems because the blades are inside and not spinning rapidly out in the open. Further, for example, the noise the system generates is typically less than that of conventional systems and the walls of the ducts can be treated (as is done in commercial jet engine ducts) to further reduce even the small amount of noise from the airflow.

Adjustable Inlet Duct. Methods, systems, and devices of the present invention include means for controlling fluid flow at the fan face of a turbine. To accomplish this, a duct, tube, or channel (used interchangeably herein) with at least one variable or adjustable inlet can be incorporated upstream of the turbine for collecting, containing, and directing fluid flow through the turbine. As needed, the flow of fluid into the device can be accelerated or decelerated and/or the mass of fluid collected by the device can be increased or decreased to provide controlled generator power output.

The opening of the duct (inlet) can be reduced or enlarged to allow more or less fluid into the system or to accelerate or decelerate fluid flow, as needed. Although the embodiments described below will refer to particular types of inlets that can be used, the shape or size of the inlets is not a critical aspect of the invention. For example, fluid control can be accomplished with at least one inlet flap, which too needs to be of no particular shape or size.

Means for adjusting or controlling the duct opening or flaps can also be incorporated. Flaps and duct openings can be easily controlled automatically. The flow at the fan of the turbine can be controlled so that the generator output is constant. If the turbine speed increases, the inlet system can be closed to reduce the flow at the turbine and, conversely, if the turbine speed starts to drop, the inlet system can be opened to capture more flow and increase the speed at the turbine. The way the inlet area is changed could be mechanically (e.g., hydraulic or compressed air actuators to move the inlet), electrically (electric actuators), or even aerodynamically (the flow can cause a force which can be used to open or close the inlet). Flaps are only one of the many designs for controlling fluid flow according to this invention. An inlet comprising a flexible material, even if not technically considered a flap, is also contemplated within the scope of this invention.

The system can also be used "backwards" meaning that the flow through the duct can be reversed and the system will still produce power. Such a system is expected to be useful for mounting on buildings with pitched roofs. For example, for buildings on the coastline, the wind is usually perpendicular to the coastline but equally from land to water and from water to land. Therefore, having the system built into the roof using the roof as part of the inlet to guide the flow into the system would allow the system to be stationary (i.e., not rotating as most wind turbines) and the flow would generate power in either wind direction.

The system can be designed to adapt to different fluid flow conditions. The duct opening (inlet), by being able to adapt to different external fluid flow conditions, is capable of achieving optimal and/or constant speed of the internal fan regardless of external fluid flow conditions. Maintaining or controlling power output by maintaining a constant and/or optimal rpm for the turbine can result in an AC output at or near the same range of frequencies for most of the fluid input conditions, which will reduce the cost and complexity of the transformers.

Nozzle. Optionally, the methods, systems, and devices according to the invention can include a nozzle to help reduce any interference or "back pressure" on the exhaust side of the fan caused by turbulence through the duct or turbine.

The methods, systems, and devices of the present invention include at least one ducted turbine having at least one adjustable inlet for controlling turbine speed. In preferred embodiments, a plurality of variable inlet ducted turbines can be used.

Additionally, the systems can be incorporated into vehicles that have to move through the environment. The systems can be designed so as to provide propulsion for the vehicle when needed and harvest energy when it is available. For example, if the system were incorporated into a boat or submarine, the system can accelerate water to provide propulsion to move the vehicle but when the vehicle gets where it is going, the vehicle can anchor itself and the water flowing through system can be harvested to generate power. Also, the system can harvest power for its own use from the flowing fluid (in this example, water) caused by the vehicle moving from other methods (such as sail power or being towed by another vehicle). The vehicle could be an aircraft that uses the system to produce thrust or harvest power when the aircraft is soaring or being towed, so a sailplane could be built that operates with no external power source once the vehicle is launched. Further, for example, an aerostat (tethered airship) can be fitted with these systems to allow the system to be positioned in the best wind field. The tether provides a convenient way to get the power from the generator to the power grid on the ground.

One embodiment of the present invention is to provide methods, systems, and devices for energy generation comprising a fluid turbine generator having at least one adjustable inlet for controlling turbine speed. The present invention also provides such methods, systems, and devices, wherein the fluid is chosen from at least one of liquids, gases, and plasmas, including water, air, and steam. Even further, the present invention provides such methods, systems, and devices, wherein the turbine is a wind and/or water turbine.

Additionally, the present invention provides inlets for energy generation devices comprising at least one adjustable inlet for controlling turbine speed. The present invention, thus, includes providing adjustable inlets for fluid turbine generators. Further, the present invention provides adjustable inlets for adjusting fluid flow through a turbine generator and, in particular, prior to fluid contacting the turbine. Further still, the present invention includes such inlets for controlling flow through the blades of the turbine and, in particular, for controlling fluid flow at the fan face to keep the turbine rotating at a reasonably steady or constant speed. The present invention includes such inlets for wind and/or water turbine generators.

The present invention includes methods, systems, and devices for energy generation comprising means for adjusting fluid flow to control turbine speed and, preferably, to provide constant turbine speed. Additionally, the present invention includes such methods, systems, and devices, which are wind- and/or water-based.

Still further, the present invention includes methods, systems, and devices for energy generation comprising a fluid turbine generator having at least one adjustable inlet, which generate controlled and/or constant power.

DETAILED DESCRIPTION OF VARIOUS EMBODIMENTS OF THE INVENTION

Reference will now be made in detail to various exemplary embodiments of the invention. It is to be understood that the following detailed description is presented for the purpose of describing certain embodiments in detail. Thus, the following detailed description is not to be considered as limiting the invention to the embodiments described. Rather, the true scope of the invention is defined by the claims.

Additionally, the following embodiments describe methods, systems, and devices for energy generation using wind as the fluid energy source. Each of the embodiments described is equally suitable for any fluid energy source, including, for example, water, whether or not such embodiments could or should be modified to suit a particular fluid-based application.

Figure 1A:
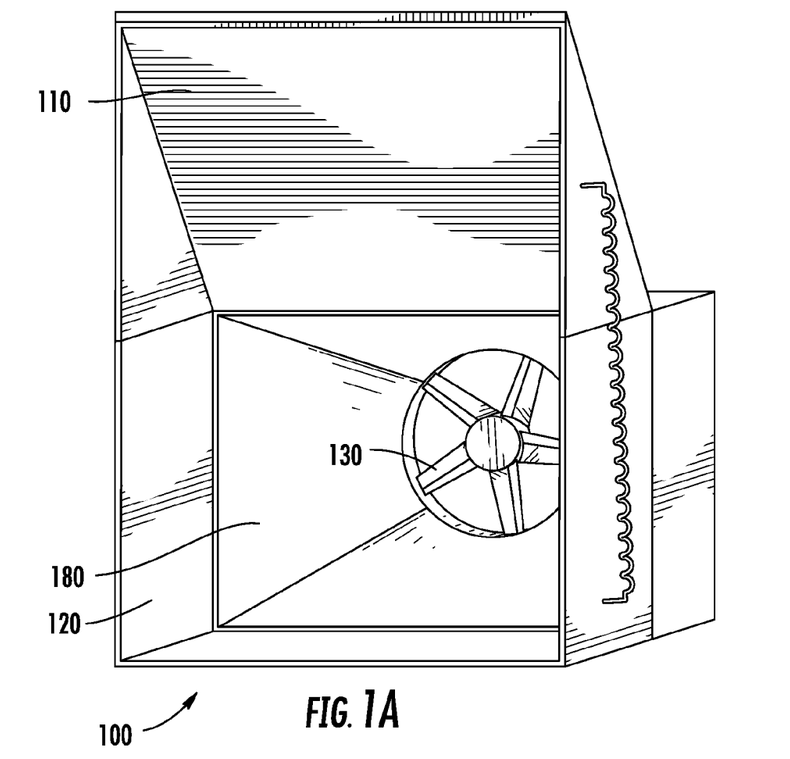
FIGS. 1a and 1b show one embodiment of a ducted variable inlet for energy generation and demonstrate operation of the system.
Figure 1B:
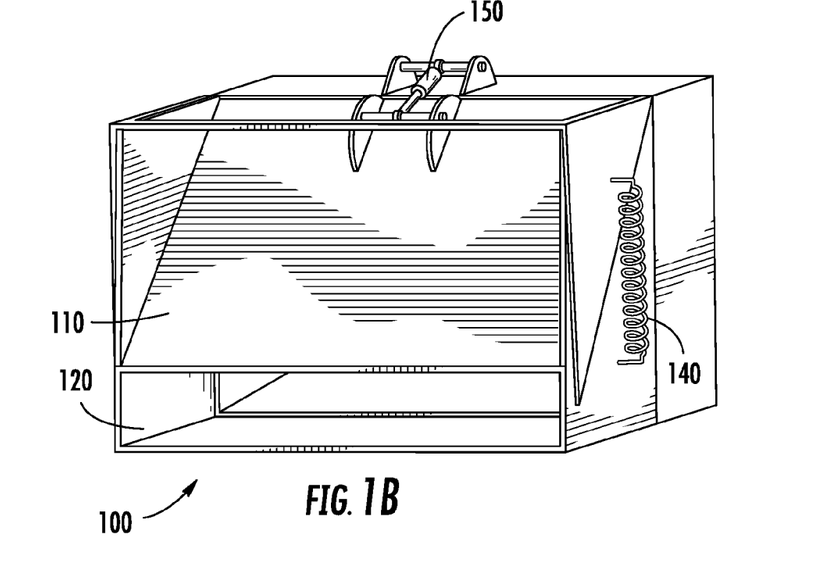
Figure 2:
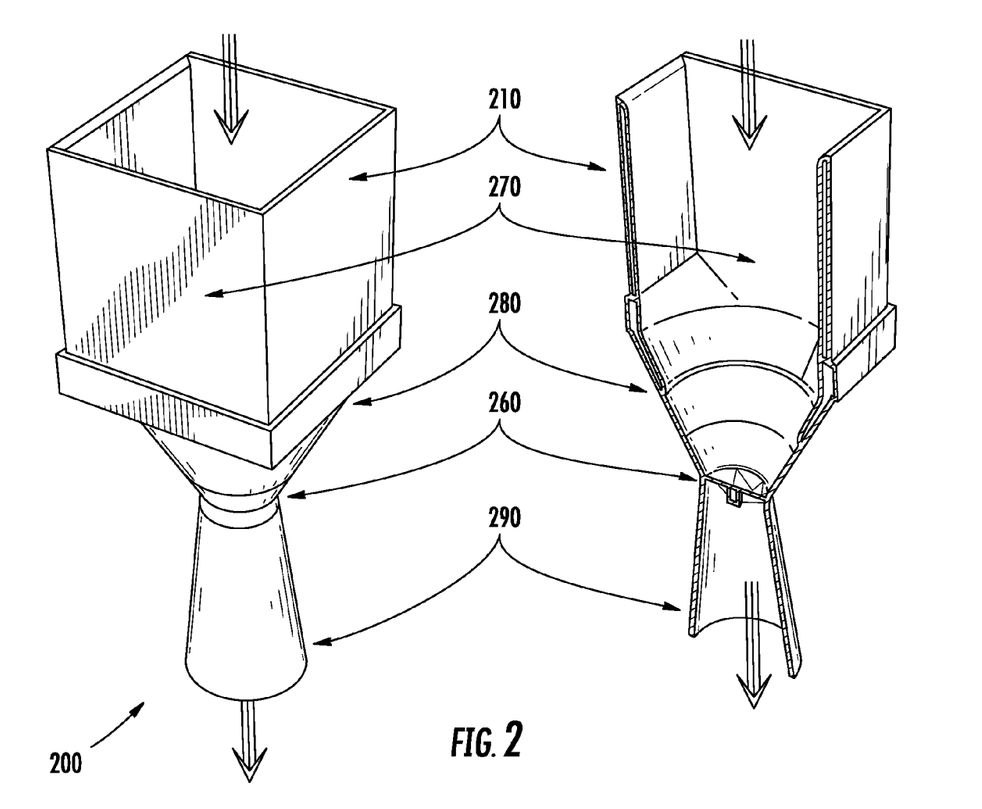
FIG. 2 shows an embodiment of a ducted variable inlet for energy generation and demonstrates a representative way fluid may pass through the system.

FIGS. 1 and 2 include inlets for controlling fluid flow at the fan face of a turbine. The adjustable inlets provide for the capture of an appropriate amount of air to generate relatively constant power output in any energy generation system. This means for fluid control can be incorporated into or with any fluid-powered turbine generator or generator system.

FIGS. 1a and 1b show one embodiment of a ducted variable inlet for energy generation and demonstrate operation of an energy generation system (100). Typically, at low wind speed inlet flap (110) is open to an appropriate extent to allow for capture of, e.g., a maximum amount of air. Capture area (120) can be adjusted by opening or closing inlet flap (110) an appropriate amount. As wind speed increases, inlet flap (110)

can be adjusted to capture less air, if appropriate for the circumstances. Adjustment of capture area (120) can be accomplished by adjusting inlet flap (110), for example, automatically with the assistance of computer-controlled mechanisms in combination with sensors. There can be any number or configuration of inlet flaps (110) in combination with fixed inlet sides, or the entire inlet can be adjustable, so long as the objective of capturing less or more air volume is achieved. Such adjustable inlet configurations provide for control of the amount of air that reaches the fan face (130), which in turn provides for control of energy generation. System (100) can also comprise fixed convergent inlet (180) for directing fluid flow toward fan face (130).

FIG. 1b shows an adjustable inlet flap (110) positioned to capture a lesser amount of air than in FIG. 1a, as is shown by a comparison of capture areas (120). Flap (110) can be controlled by any means capable of allowing flap (110) to open or close, such as with a spring (140) and/or other mechanism, such as a hinge or hydraulic mechanism (150).

The embodiment of FIG. 2 shows an embodiment of a ducted variable inlet for energy generation and demonstrates a representative way fluid may pass through the system (200). For example, the system (200) of FIG. 2 comprises a turbine generator (260), such as a Ring Motor & Fan, and a duct and variable inlet system comprising an Adjustable Inlet Flap (210), Fixed Inlet Sides (270), Fixed Convergent Inlet (280), and Diffuser Nozzle (290). This is just one of many configurations possible with the systems of the invention. System (200) can also be modified to have fewer or no fixed inlet sides (270). Air entering and leaving system (200) is shown by the vertical arrows in this drawing.

Any turbine generator can be used with the present invention. For example, a ring motor having an outside diameter of 7 inches can be used. In this embodiment, a Ring Motor & Fan is shown as the generator. In particular embodiments it is possible to use a 7-inch inside diameter ring motor with, for example, a 7-inch outside diameter fan. In preferred embodiments, 7-inch inside diameter ring motors having an outside diameter of 8¼ inches could be used, such as a motor supplied by a company called ThinGap.

The duct and the variable inlet need not conform to any particular shape, size, or configuration. Any shape or size duct will suffice and any adjustable duct opening for controlling fluid flow at the fan face of the turbine will suffice. An inlet comprising a flexible material could constitute an adjustable duct opening. The variable inlet can comprise any number of adjustable inlet flap(s). In this embodiment, one or more of the Inlet Sides can be Adjustable Inlet Flaps. The inlet of this embodiment is adjustable due to the flap(s). By positioning any number of inlet flap(s), a variable inlet can be achieved, and fluid flow at the fan face of the turbine can be controlled.

A means for adjusting the variable inlet can be of any capable means. In this embodiment, any means capable of opening and closing the inlet flap(s) will suffice. For example, a spring can provide this means. The opening and closing of the inlet flap(s) in this or any other embodiment (through the springs or any other means) can be performed manually or automatically, and any device or system for achieving a variable inlet can be employed.

In particular embodiments, when the flap(s) of the variable inlet are orthogonal with respect to the duct (in this embodiment the flap forms one side of the duct), the opening of the duct is rectangular and can be configured to be about six times larger in area than the opening for the fan. With the inlet flap(s) in this position, the wind stream is compressed about six times, so the velocity of the wind stream is about six times faster than ambient. The system can be designed to adapt to whatever air flows through the system. In the configuration just described, there is a 10 to 1 increase in the velocity of the air when the intake flap(s) are in the most open position, so the flow at the fan face and through the fan is 100 mph when the ambient wind is 10 mph, for example.

When the wind velocity is 2 mph (which is typically considered too slow for normal wind turbine designs, thus, resulting in a stationary turbine), this design can exhibit an airflow speed at the fan face of about 20 mph and produce about 400 watts. Although (with wind velocity conditions of about 2 mph) the power will not be at the optimal rpm or frequency, it is still usable power. The faster the wind speed the faster the rpm and frequency up to the point where the optimal rpm and frequency are obtained (at about 10 mph ambient wind speed for this embodiment). At that point, the inlet can start to close to maintain the optimal rpm and frequency operation. As the ambient wind speed increases, the inlet flap(s) can be adjusted to close the opening. That way the fan speed and rpm is constant.

The variable size of the opening of the duct can be achieved by moving the inlet flap(s). The duct opening is capable of being enlarged or reduced in size based upon the desire to maintain optimal and/or constant speed of the fan, e.g., rpm. Maintaining a constant and/or optimal rpm, means that the AC output will be near the same frequency for most of the input ambient conditions. In this embodiment, this optimal rpm produces about 2 kW of power and, since the frequency is constant, the transformer design that is needed to convert the frequency to grid frequency and voltage can be simplified. Thus, the range of operation can be extended compared to normal wind turbine designs, and such systems are capable of providing power output near the same over the entire range.

The inlet can close to the point where the airflow at the fan face is less than the ambient wind speed, as well. All current wind turbine designs have to shut down in high winds because the generator over heats, the blades rotate too fast, and/or the drag on the system over stresses the tower. This design will allow the system to continue producing power even in hurricane conditions, because the generator is running at the same speed, the fan blades are running at the same speeds, and the drag on the box is not increased because the box frontal opening is actually reduced from the maximum open condition.

The control system requirements of the present invention are easy to meet. The generator rpm is the "output variable," which is monitored or analyzed for a particular system in order to provide a particular power output range. The "control effecter" is the opening of the duct, which can be adjusted with, for example, an adjustable flap. When the rpm is too fast, then the flap can be closed and when the rpm is too low, the flap can be opened. The control system in such a configuration needs very little gain adjustment.

Figure 3:
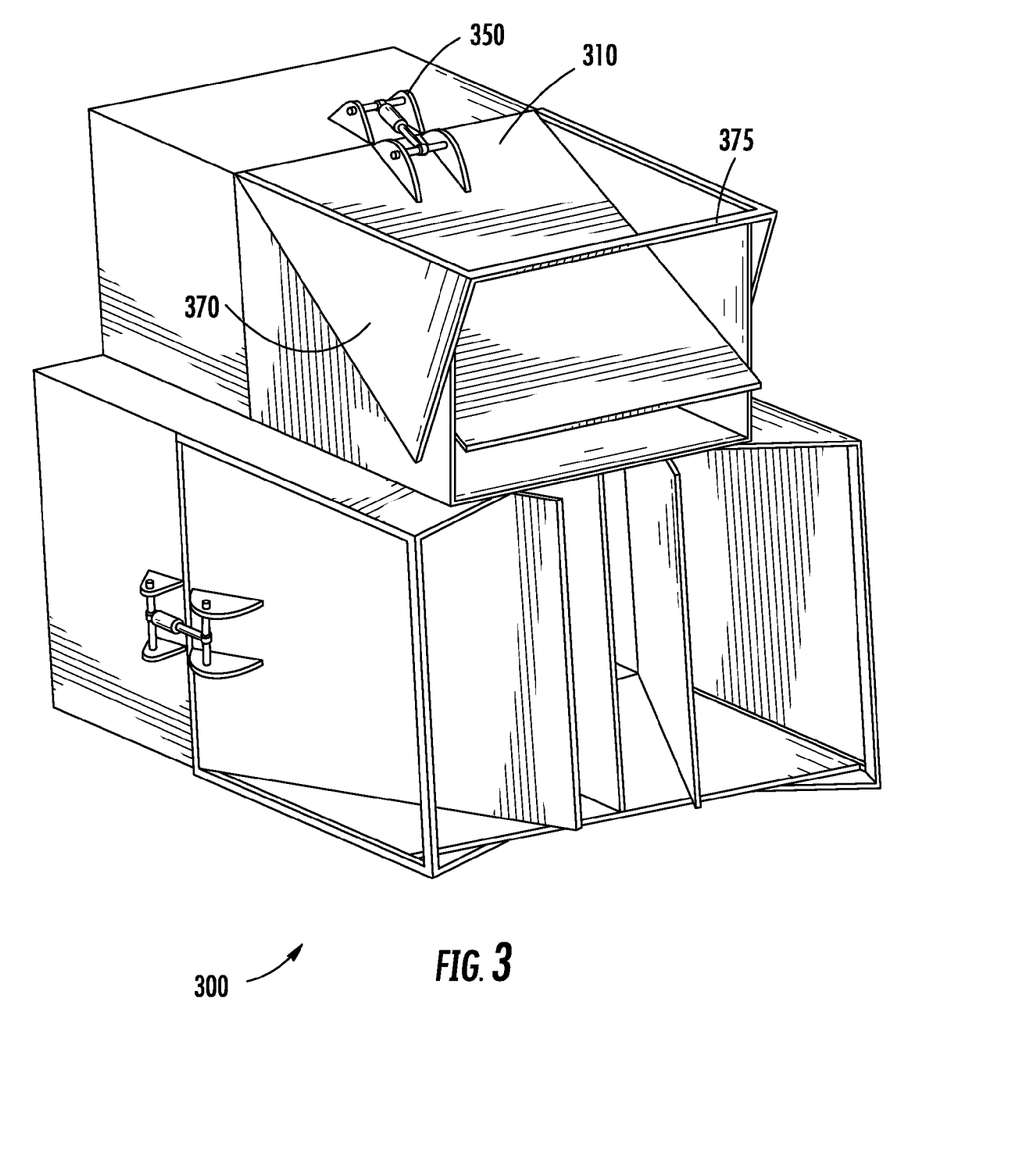
FIG. 3 shows an embodiment of a ducted variable inlet system comprising three variable inlets, where the duct opening is reduced.
Figure 4:
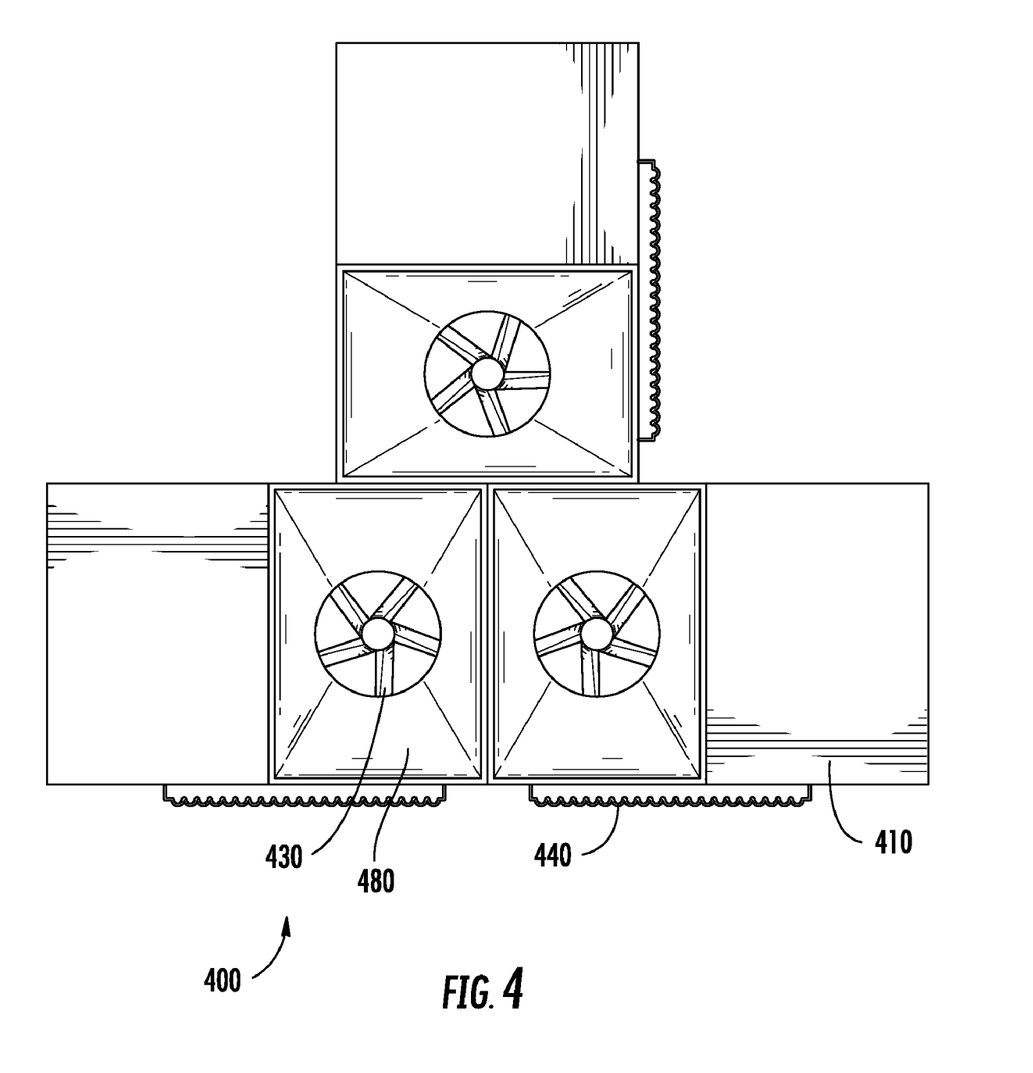
FIG. 4 shows an embodiment of a ducted variable inlet system comprising three variable inlets, where the duct opening is enlarged.

In preferred embodiments, more than one system or device can be used. FIGS. 3 and 4 show how three systems or devices can be configured for use at one time. For example, FIG. 3 shows an embodiment of a ducted variable inlet system (300) comprising three variable inlets, where the duct opening is reduced. Inlet flaps (310) are open an amount typical for capturing air at generally higher wind speeds. Also shown are fixed inlet sides (370) and support (375) for maintaining the overall configuration of the system (300). Means for facilitating opening and closing of the flaps (310) is provided by any of a hinge, hydraulic, spring, or other appropriate mechanism (350). FIG. 4 shows an embodiment of a ducted variable inlet system (400) comprising three variable inlets, where the duct opening is enlarged. Inlet flaps (410) are open an amount typical for capturing air at generally lower wind speeds. Very generally, the more open the inlet flaps (410) are, the more air volume will be captured (if wind speed and density and otherwise kept the same) and the more closed the inlet flaps (410) are, the less air volume will be captured. Also shown in FIG. 4 are fan (430), which is operated by the air captured by system (400) and a convergent portion of the inlet (480), which serves to direct the captured air toward the fan face (430).

With three systems or devices about 6 kW of power could be produced. Using three systems would also facilitate remote checking of the operational capability of the system because flap position can be compared to determine that the systems are operating at the peak performance. Three systems would also facilitate the identification and isolation of any broken system or identify any redundancies. If using only one system, other monitoring means could be employed to determine if the flow was producing the right amount of power for the ambient wind conditions and/or to verify that the system is operating as desired.

As is evidenced by the above-provided description of the present invention, including the examples provided, the present invention has many practical applications. A few examples of the different applications and uses for the invention, which are intended to be exemplary in nature only, are provided below.

The present invention is acceptable for and can be adapted accordingly to be applicable to numerous applications, for example, for commercial, residential, and portable use. The small size and modularity focus of the system will allow users to get the right number and size units to provide the power they need for their application. The system will generate power at voltages near that for normal home use but higher constant AC frequency, so there will be less loss if the line length is long between the generators and the end user. There will be times when the user is not using all the power generated and so the installation will use transformers to convert the power to the correct frequency and voltage for home use, grid power use, or DC for battery charging. The intent is to use the power directly or send it to the grid and not store it as the losses from the charge/discharge of batteries increase cost and reduce utility, but the system will be able to use storage batteries. Many States have programs in place to buy power from home or small power producers at the cost that the utilities sell it to the users.

Other options for users that are not on the grid (or where the local utilities do not buy power) are to integrate this system into their total energy management network. The excess power can be used to pump well water up a tower, heat water in the hot water tank, or make ice for storage. The water in a tower stores the power as potential energy and when water is needed it is provided without having the electrically driven pumps come on. The hot water tank can be used to store water at higher temperature or more volume than normal as another way to store energy as water heating is a large user of energy in the home. Running an ice-maker that stores the ice for later use is another way that excess power can be effectively stored as ice is needed for the home and can be stored with little impact. Even home air conditioning can be affected by the energy management network and used to keep energy usage matched to the generator output. The temperature can be allowed to drift away from the desired ideal temperature for the whole house, or areas can be allowed to have different temperatures (rooms that are not being used versus rooms in use) when power is not available. When excess power is available, the whole house can be brought back to the desired condition. Also, coupling wind power generation with solar, ground water ponds with water powered turbine generators, and even efficient wood-burning stoves that provide heating (for the house and/or the hot water) allow the isolated energy user to have the power whenever they want it. The exhaust from these wood-burning stoves has energy that can be funneled through one of these fluid turbine generators to provide additional power. If the energy use fluctuates wildly or all these sources can not provide the power for some limited time then battery back-up may be required but these alternatives may offer lower cost options.

For example, the inventive methods, systems, and devices can be incorporated with or installed on existing cell towers (indeed, any existing tower, structure, or building) to harvest wind power at desired and/or optimal heights to take advantage of unobstructed or less obstructed wind sources. Further, such installations could include mechanisms for later adjusting the height and direction of the inventive devices relative to the tower, depending, for example, on wind conditions at various heights or directions. The use of existing structures, e.g., cell, radio and satellite towers, as well as buildings, light posts, etc. can result in lower installation and/or maintenance costs, as well as not contributing to the aesthetic demise of a particular location.

Additionally, the portable aspect of the inventive methods, systems, and devices is also readily apparent. By mounting such devices to portable objects, such as vehicles, remote locations can be served with electrical power, and electrical power can be generated at locations requiring a source of back-up electrical power, such as in emergency situations.

The inventive methods, systems, and devices can be incorporated or integrated with bridges, rooftops, and roof slopes to harness fluid power, including wind and water flow.

It is further understood that the inventive methods, systems, and devices contemplate single- or multiple-fluid applications. For example, individual methods, systems, or devices can be used for wind- and/or water-based applications. Further, the inventive methods, systems, and devices are capable of harnessing any water power source and are capable of integration with any existing structure that is used to harness water power or that can be adapted to harness water power, such as rain, rivers, dams, streams, pools, street gutters, and rooftop gutters, etc. These uses of water provides a great way to store potential energy and allow the energy generated to be more "on-demand" because the water level can be allowed to rise when energy is not needed and can be allowed to drop when needed. Also, the excess power can be used to "pump" water "up hill" to store the energy for later use.

It will be apparent to those skilled in the art that various modifications and variations can be made in the practice of the present invention without departing from the scope or spirit of the invention. Other embodiments of the invention will be apparent to those skilled in the art from consideration of the specification and practice of the invention. It is intended that the specification and examples be considered as exemplary only.

The invention claimed is:

1. A device for extracting energy from a flow of fluid comprising:
 a turbine;
 at least one duct upstream of or surrounding the turbine;
 wherein the duct comprises an opening for collecting gas or liquid flow; and
 wherein the opening comprises means for reducing or enlarging opening size during operation.

2. The device according to claim 1, wherein said turbine comprises blades, all of which are contained within said duct.

3. The device according to claim 1, wherein said means for reducing or enlarging opening size comprises at least one flap with means for opening and closing the flap relative to the opening.

4. A system for extracting energy from a flow of fluid comprising at least two devices of claim 1.

5. A system for converting variable wind energy into electrical energy comprising:
  a turbine generator comprising a fan with blades;
  at least one duct upstream of or surrounding the blades, wherein the duct comprises an inlet for collecting gas or liquid fluid flow; and
  a control system for controlling turbine speed within a target range, wherein the control system comprises means for monitoring turbine speed, means for adjusting inlet opening size, and means for activating the adjusting of the inlet opening size during operation in response to a specified monitored speed.

6. The device according to claim 5, wherein said fluid moves relative to said turbine, said turbine moves relative to said fluid, or said fluid moves relative to said turbine and said turbine moves relative to said fluid.

7. An adjustable inlet for collecting a flow of fluid for use in a fluid powered energy generation device comprising:
  an inlet for collecting a liquid or gas flow comprising means for adjusting inlet opening size during operation;
  means for providing the flow to a fluid powered energy generation device;
  a control system comprising means for detecting fluid flow rate and means for activating the adjusting of the inlet opening size during operation in response to the flow rate detected to achieve a target fluid collection rate.

8. An adjustable inlet according to claim 7, wherein said inlet is a flap.

9. A method of generating controlled power comprising:
  collecting a liquid or gas flow into an inlet of a ducted turbine;
  monitoring turbine speed;
  maintaining turbine speed within a target range by adjusting inlet opening size during operation in response to a specified monitored speed.

10. The method according to claim 9, wherein the adjusting of the inlet opening size is performed by moving a flap relative to the opening to increase or decrease inlet opening size.

11. The method according to claim 10, wherein said fluid moves relative to said turbine, said turbine moves relative to said fluid, or said fluid moves relative to said turbine and said turbine moves relative to said fluid.

12. A portable device for extracting energy from a flow of fluid comprising:
  a portable turbine;
  at least one duct upstream of or surrounding the turbine;
  wherein the duct comprises an opening for collecting gas or liquid flow; and
  wherein the opening comprises means for reducing or enlarging opening size during operation.

13. The portable device according to claim 12, wherein said means for reducing or enlarging opening size comprises at least one flap with means for opening and closing the flap relative to the opening.

14. A system for extracting energy from a flow of fluid comprising at least two devices of claim 12.

15. The portable device according to claim 12, wherein said means for reducing or enlarging opening size during operation also varies an amount of fluid collected.

* * * * *